United States Patent
Shao et al.

(10) Patent No.: US 10,558,919 B2
(45) Date of Patent: *Feb. 11, 2020

(54) PREDICTIVE ANALYSIS WITH LARGE PREDICTIVE MODELS

(71) Applicant: International Business Machines Corporation, Armonk, NY (US)

(72) Inventors: Yi Shao, Xi'an (CN); Lei Tian, Xi'an (CN); Jing Xu, Xian (CN); Peng Xue, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 561 days.

This patent is subject to a terminal disclaimer.

(21) Appl. No.: 15/257,007

(22) Filed: Sep. 6, 2016

(65) Prior Publication Data

US 2018/0068220 A1    Mar. 8, 2018

(51) Int. Cl.
  *G06N 5/02* (2006.01)
(52) U.S. Cl.
  CPC .................... *G06N 5/022* (2013.01)
(58) Field of Classification Search
  CPC . G06N 5/022; G06N 99/005; G06F 17/30539
  USPC ...................................................... 706/45–58
  See application file for complete search history.

(56) References Cited

U.S. PATENT DOCUMENTS

| | | | |
|---|---|---|---|
| 8,209,271 B1 | 6/2012 | Lin et al. | |
| 8,370,280 B1 | 2/2013 | Lin et al. | |
| 8,392,153 B2 | 3/2013 | Pednault et al. | |
| 8,626,791 B1 | 1/2014 | Lin et al. | |
| 8,775,233 B1 | 7/2014 | Lybrook | |
| 8,868,472 B1 | 10/2014 | Lin et al. | |
| 8,924,935 B1* | 12/2014 | Chopra | G06F 8/71 717/120 |
| 2011/0131164 A1* | 6/2011 | Surpi | G06N 7/00 706/13 |
| 2012/0191630 A1 | 7/2012 | Breckenridge | |
| 2012/0191631 A1* | 7/2012 | Breckenridge | G06N 99/005 706/12 |

(Continued)

OTHER PUBLICATIONS

Huang et al., "A Novel Trigger Model for Sales Prediction with Data Mining Techniques", CODATA Data Science Journal Proceedings Papers, <http://datascience.codata.org/article/10.5334/dsj-2015-015/>, Published on May 22, 2015, 22 Pages.

(Continued)

*Primary Examiner* — Shahriar Behnamian
(74) *Attorney, Agent, or Firm* — Gilbert Harmon, Jr.; Alexander G. Jochym; William H. Hartwell (57) ABSTRACT

An approach to optimizing predictive model analysis, comprising creating one or more model templates, decomposing a predictive model, wherein model information is extracted from the predictive model, storing the model information in the one or more model templates, creating a plurality of sub-models, associated with the predictive model, using the stored model information, sending the plurality of sub-models to a scoring engine, receiving results based on the plurality of sub-models from the scoring engine and generating predictions based on combining the results received from the scoring engine. The generated predictions can be sent to one or more analytic applications for further processing.

13 Claims, 8 Drawing Sheets

(56) References Cited

U.S. PATENT DOCUMENTS

| | | | |
|---|---|---|---|
| 2013/0151383 A1 | 6/2013 | Gancarz et al. | |
| 2014/0279784 A1 | 9/2014 | Casalaina | |
| 2015/0151383 A1 | 6/2015 | Hillen | |
| 2015/0339572 A1 | 11/2015 | Achin et al. | |
| 2016/0117441 A1 | 4/2016 | Bremel | |
| 2016/0350672 A1 | 12/2016 | Snyder | |
| 2016/0364647 A1* | 12/2016 | Achin | G06N 5/02 |
| 2017/0038919 A1 | 2/2017 | Moss | |
| 2017/0140053 A1* | 5/2017 | Vorobev | G06F 17/3053 |
| 2017/0308535 A1* | 10/2017 | Agarwal | G06F 17/3053 |
| 2018/0114122 A1* | 4/2018 | Shao | G06N 99/005 |
| 2018/0137423 A1* | 5/2018 | Shao | G06N 99/005 |

OTHER PUBLICATIONS

"PMML: Accelerating the Time to Value for Predictive Analytics in the Big Data Era", SYBASE, An SAP Company, <www.sybase.com>, Sybase Inc., © 2012, 8 pages.

U.S. Appl. No. 15/856,622, filed Dec. 28, 2017.

List of IBM Patents or Patent Applications Treated as Related. Filed Herewith. 2 pages.

Shao et al., "Predictive analysis with large predictive models", U.S. Appl. No. 15/869,546, filed Jan. 12, 2018.

IBM, Appendix P, list of patents or patent applications treated as related, filed herewith, 2 pages.

Kohn, M.C., et al. "A block organized model builder." Mathematical and computer modelling 19.6-8 (1994): 75-97.

\* cited by examiner

```
<PMML version="4.0" xmlns="http://www.dmg.org/PMML-4_0"
...>
  <Header description="Random Forest Tree Model">
  <DataDictionary numberOfFields="10">
<DataField>...</DataField>
...
  </DataDictionary>
  <MiningModel modelName="randomForest_Model" functionName="classification">
    <MiningSchema>...</MiningSchema>
    <Segmentation multipleModelMethod="majorityVote">
      <Segment id="1">
        <True/>
        <TreeModel modelName="1" functionName="classification" algorithmName="rf" splitCharacteristic="binarySplit">
          <MiningSchema>...</MiningSchema>
          <Node id="1">
            <True/>
            <Node id="2">
              <SimpleSetPredicate field="Input01" booleanOperator="isIn">
              <Node id="3">
                ...
              </Node>
              ...
            </Node>
          </TreeModel>
        </Segment>
        <Segment id="2">
        ...
        <Segment id="200">
      </Segmentation>
    </MiningModel>
</PMML>
```

FIG. 5

| Master Model Template | |
|---|---|
| Model ID 402 | pmml1 |
| General Info. 404 | \<Key>PMML\</Key>\<Value>\<PMML version="4.0" xmlns="http://www.dmg.org/PMML-4_0" ...>\</Value> \<Key>Header\</Key>\<Value>\<Header description="Random Forest Tree Model">\</Value> |
| Data Info. 406 | \<Key>DataDictionary\</Key>\<Value>\<DataDictionary numberOfFields="10">\<DataField>...\</DataField> ...\</DataDictionary>\</Value> |
| Type 408 | Classification |
| Number of Models 410 | 200 |
| Combination Method 412 | majorityVote |
| Extension Info. 414 | N/A |

FIG. 6A

| Associated Models Template | | | |
|---|---|---|---|
| Sub-Model ID 452 | Model ID 454 | Order 456 | Sub-Model Information 458 |
| sub-model 1 | pmml 1 | 1 | ... |
| sub-model 2 | pmml 1 | 2 | ... |
| sub-model 3 | pmml 1 | 3 | ... |
| ... | ... | ... | ... |
| sub-model 200 | pmml 1 | 200 | ... |

FIG. 6B

```
<PMML version="4.0" xmlns="http://www.dmg.org/PMML-4_0" ...>
 <Header description="Random Forest Tree Model">
 <DataDictionary numberOfFields="10">
<DataField>...</DataField>
...
 </DataDictionary>
 <TreeModel modelName="1" functionName="classification"
algorithmName="rf" splitCharacteristic="binarySplit">
   <MiningSchema>
   <Node id="1">
    <True/>
    <Node id="2">
      <SimpleSetPredicate field="Input01" booleanOperator="isIn">
      <Node id="3">
       ...
     </Node>
    ...
   </Node>
 </TreeModel>
</PMML>
```

PREDICTIVE ANALYSIS WITH LARGE PREDICTIVE MODELS

BACKGROUND

The present invention relates generally to the field of predictive analytics, and more particularly to predictive models.

Predictive analytics is an application of data mining and machine learning used to predict future behavior and outcomes. Predictive models are programs used for analyzing data to calculate probabilities related to certain events, which is useful for decision making purposes. Predictive models are trained for predictive analysis based on input data and the models can be validated and/or refined as more data is ingested. For example, predictive models are employed in the fields such as consumer marketing, meteorology, economics and insurance, among others, to help institutions and businesses make informed decisions.

SUMMARY

According to one embodiment of the present invention, a method for optimizing predictive model analysis is provided, the method comprising creating, by a model decomposer, one or more model templates; decomposing, by the model decomposer, a predictive model, wherein model information is extracted from the predictive model; storing, by the model decomposer, the model information in the one or more model templates; creating, by the model decomposer, a plurality of sub-models, associated with the predictive model, using the stored model information; sending, by the model decomposer, the plurality of sub-models to a scoring engine; receiving, by the model decomposer, results based on the plurality of sub-models from the scoring engine; and generating predictions based on combining the results received from the scoring engine. A corresponding computer program product and computer system are also disclosed herein.

DETAILED DESCRIPTION

Embodiments of the present invention recognize that in the era of big data, the size and complexity of predictive models are greater than ever before. For example, a predictive model may contain association rules pertaining to thousands or millions of consumer items. Loading and parsing such a large model on a computing facility for making predictions based on consumer data can take a considerable amount of time. Embodiments of the present invention therefore provide a time-efficient solution wherein predictive models, e.g., large and complex predictive models, can be decomposed for the creation of a plurality of associated sub-models used for making predictions based on input data.

The sub-models, being smaller in size than the predictive model from which they are derived, take less time to load and parse than the whole predictive model and consume fewer computing resources. Further, the sub-models can be used to make predictions, e.g., calculate probabilities, in parallel across a plurality of different computing facilities. The prediction results of the sub-models can be combined for generating overall predictions based on input data.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
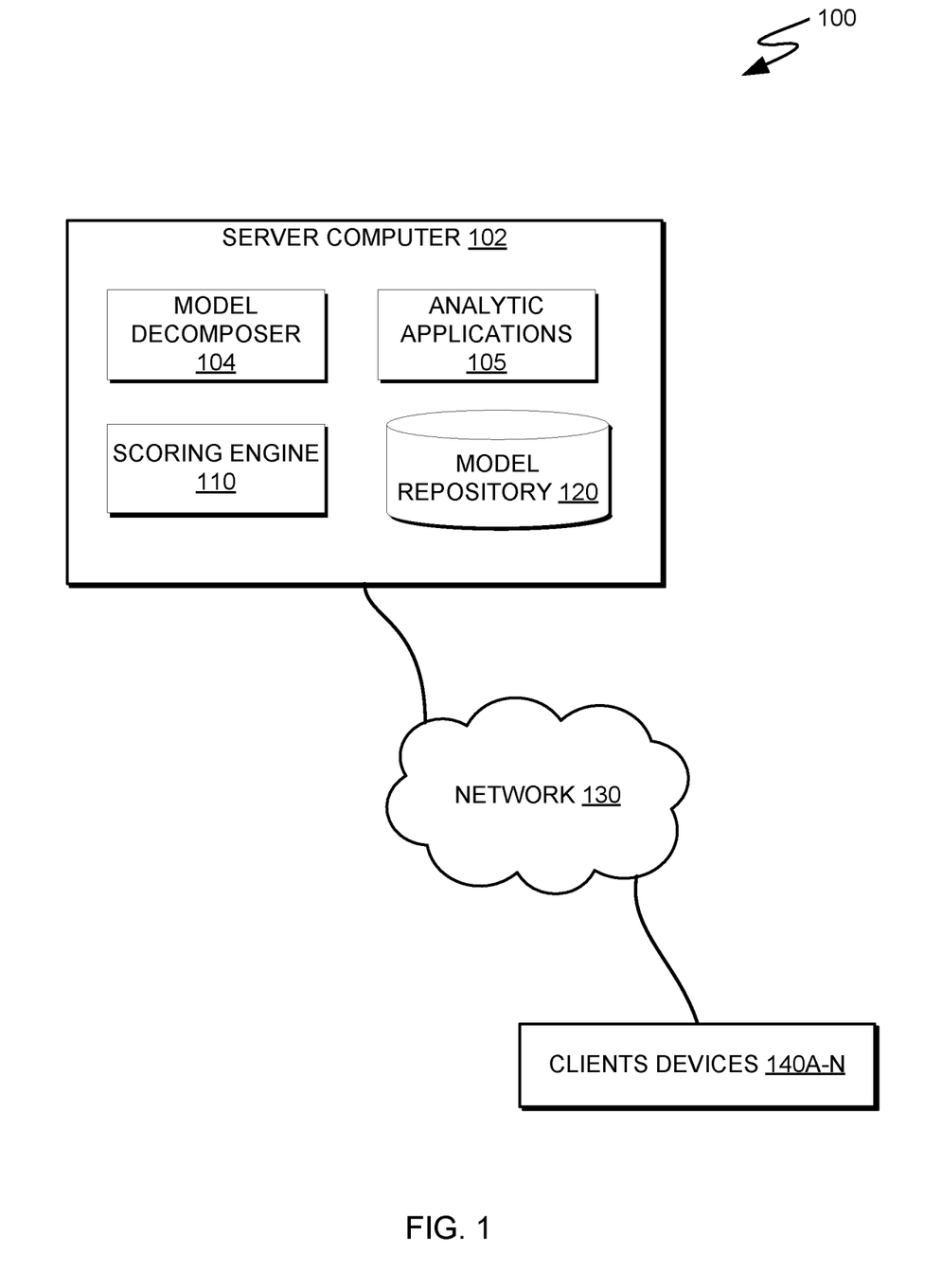
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises server computer 102 and client devices 140A-N, all interconnected over network 130.

Server computer 102 can be a laptop computer, tablet computer, netbook computer, personal computer (PC), a desktop computer, a personal digital assistant (PDA), a smart phone, or any programmable electronic device capable of communicating with client devices 140A-N via network 130. Server computer 102 comprises model decomposer 104, analytic applications 105, scoring engine 110 and model repository 120. Server computer 102 may include internal and external hardware components, as depicted and described in further detail with respect to FIG. 8.

Model decomposer 104 is a component which decomposes predictive models into a plurality of associated sub-models and combines predictions results made using the associated sub-models. Analytic applications 105 are one or more programs which can receive predictions from model decomposer 104 for further processing, e.g., making decisions based on the prediction results. An example of analytic applications 105 can be a system used by an online retailer for recommending products to a customer based on received prediction results, user browsing history, previous purchases, etc. Scoring engine 110 is one or more computing facilities, e.g., computer processors, with associated programs for executing predictive models and generating predictions. The computing facilities are sent the associated sub-models and make predictions based on input data using the sub-models. In some embodiments, scoring engine 110 can be a plurality of computing facilities residing on other computing devices, connected to server computer 102 via network 130. In another embodiment, scoring engine 110 comprises a plurality of computing facilities residing on both server computer 102 and one or more other computing devices.

Model repository 120 is a form of storage, e.g., a database, comprising, for example, but not limited to, database tables associated with one or more predictive models and associated sub-models. The database tables comprise information used by model decomposer 104 for creating the associated sub-models.

In various embodiments of the present invention, client devices 140 A-N can each respectively be a laptop computer, tablet computer, netbook computer, personal computer (PC), a desktop computer, a personal digital assistant (PDA), a smart phone, or any programmable electronic device capable of communicating with server computer 102 via network 130. In general, client devices 140A-N are representative of any number of such computing devices.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server computer 102 and client devices 140A-N.

Figure 2:
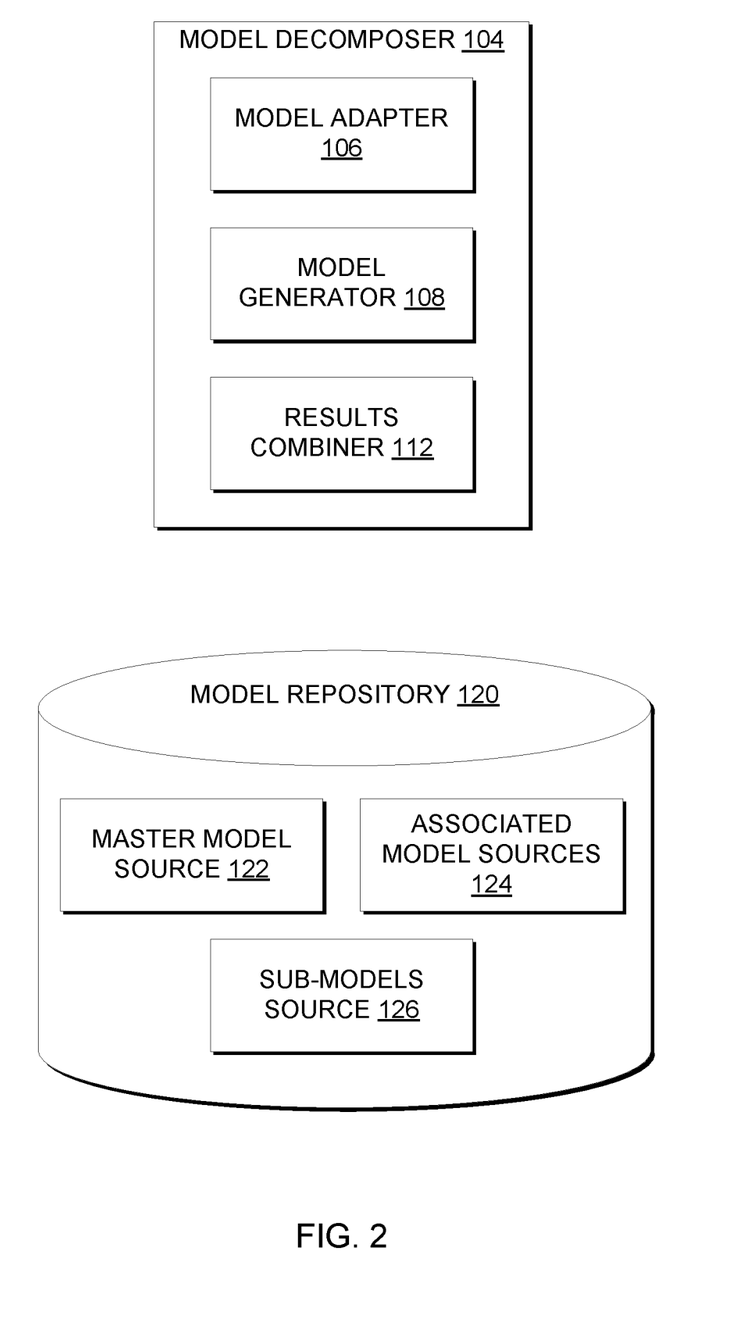
FIG. 2 is a functional block diagram depicting components of a model decomposer and a model repository, in accordance with an embodiment of the present invention.

FIG. 2 is a functional block diagram depicting components of model decomposer 104 and model repository 120, in accordance with an embodiment of the present invention. Model decomposer 104 comprises model adapter 106, model generator 108 and results combiner 112. Model adapter 106 extracts information from one or more predictive models and creates model templates, e.g., database tables, in model repository 120 for storing the information. For example, some predictive models are represented in Predictive Model Markup Language (PMML). Model adapter 106 can extract information from predictive models represented in PMML and store the extracted information in model templates it has created.

Model generator 108 uses information stored in model repository 120 to create a plurality of sub-models associated with a predictive model, wherein the sub-models are subsets of the predictive model. Model generator 108 uses information comprising the model templates for creating the plurality of sub-models and sends the sub-models to scoring engine 110. Results combiner 112 receives the results of scoring engine 110 (based on the sub-models) and combines the results to generate overall predictions.

Model repository 120 comprises model templates created by model adapter 106, e.g., master model source 122 and associated model sources 124, and sub-models source 126. Master model source 122 comprises information associated with one or more predictive models, e.g., large predictive models represented in PMML. Associated model sources 124 comprise information associated with segments of the one or more predictive models, used for creating a plurality of sub-models. Examples of master model source 122 and associated model sources 124 will be subsequently depicted and described in greater detail with respect to FIGS. 4A-B and 6A-B.

Figure 3:
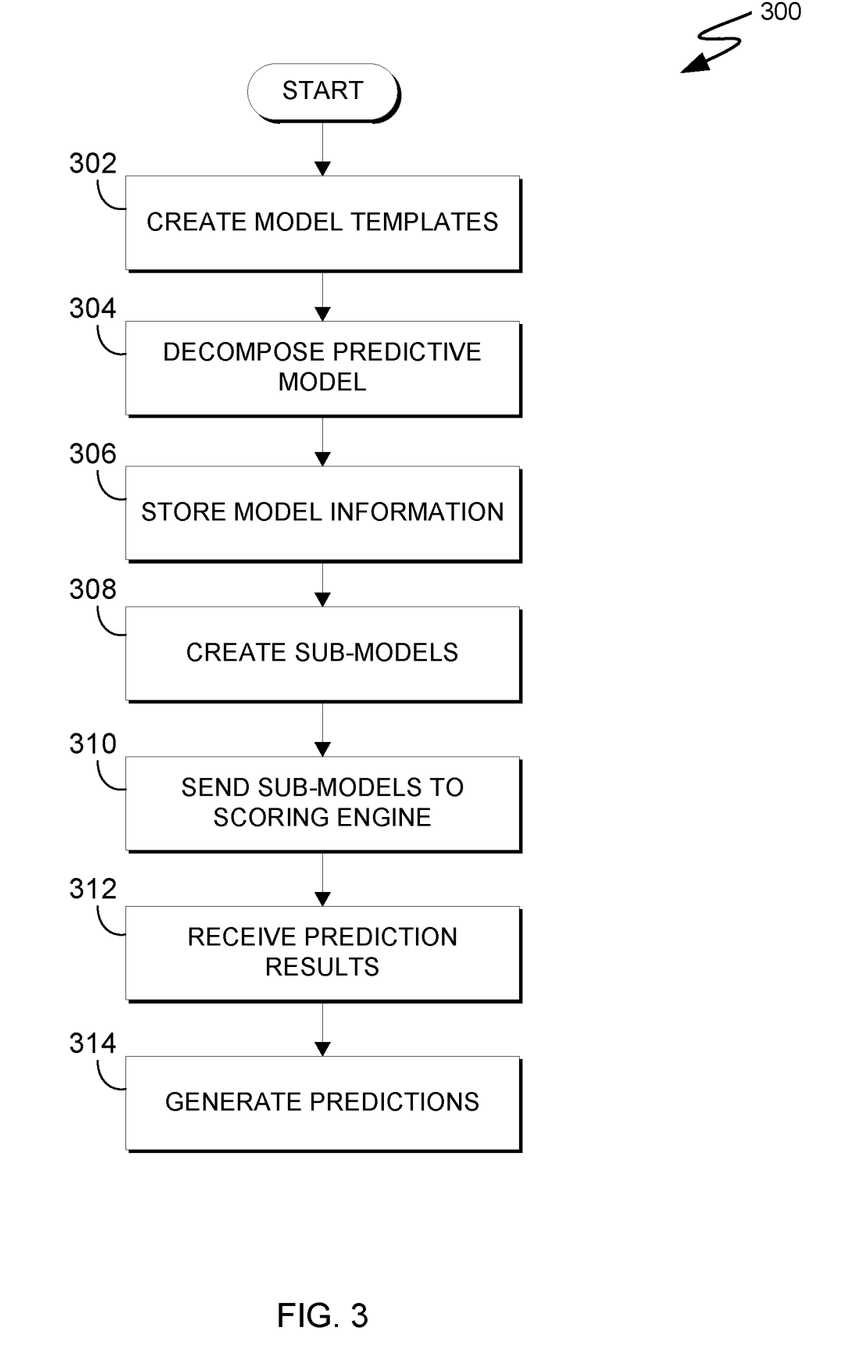
FIG. 3 is a flowchart depicting operational steps of the model decomposer, in accordance with an embodiment of the present invention.

FIG. 3 is a flowchart 300 depicting operation steps of model decomposer 104, in accordance with an embodiment of the present invention. The illustrative example of FIG. 3 is provided to facilitate discussion of aspects of the present invention, and it should be appreciated that FIG. 3 provides only an illustration of an embodiment of the present invention and does not imply any limitations with regard to the variations or configurations in which different embodiments may be implemented.

Model adapter 106 creates one or more model templates, e.g., tables, in model repository 120 (step 302). A model template associated with master model source 122 is a template used for creating a plurality of sub-models associated with one or more predictive models. Master model source 122 comprises basic categories of information associated with one or more predictive models, some of which information will be common to sets of independent sub-models that can function as independent predictive models. A model template associated with associated model sources 124 comprises information associated with segments of the one or more predictive models, information which will differentiate the various created sub-models.

Model adapter 106 decomposes a predictive model by extracting information from the predictive model (step 304). For example, for a predictive model represented in PMML, model adapter 106 can detect the model type and load a corresponding PMML schema. Some model types include, but are not limited to, association models, tree models and mining models. Model adapter 106 can extract, e.g., copy, information from fields and/or elements in a predictive model. A predictive model can further be decomposed into segments based on composition relationships associated with a model type. Model adapter 106 can detect schema elements and follow composition relationships to find occurrences of sub-elements associated with the elements. Segments of predictive models, e.g., segments of code, associated with each detected composition relationship can be extracted by model adapter 106.

Model adapter 106 stores the extracted information in the one or more model templates (e.g., master model source 122 and associated model sources 124) associated with model repository 120 (step 306). Model information can be appropriately stored by model adapter 106 in a plurality of categories comprising the one or more model templates. Particular segments of predictive models can be stored in associated model sources 124.

Model generator 108 accesses model repository 120 for creating a plurality of sub-models (step 308). Model generator 108 can retrieve the one or more model templates, e.g., master model source 122 and associated model sources 124, and use the information associated with a given predictive model to create associated sub-models. For example, model generator 108 can create the associated sub-models in PMML. For a set of sub-models corresponding to a first a predictive model, master model source 122 comprises information derived from the first predictive model which will be common to each sub-model in the set. Associated model sources 124 comprises segments of the first predictive model that model generator 108 uses to create the set of corresponding sub-models, each of which can function as a unique, independent predictive model. In some embodiments, created sub-models are stored in sub-models source 126.

Model generator 108 sends created sub-models to scoring engine 110 (step 310). Model generator 108 can send one or more sub-models of a set of sub-models, associated with a given predictive model, to different computing facilities comprising scoring engine 110, enabling predictions to be made in parallel. For example, model generator 108 can send one or more sub-models of a set to a particular computing facility based on the type of data the computing facility is processing. The computing facilities comprising scoring engine 110 can input data into the received sub-models to make predictions, e.g., calculate probabilities, based on the data. In some embodiments, scoring engine 110 can be configured to make predictions using the sub-models sequentially, e.g., in a predetermined order.

Results combiner 112 receives the prediction results of the sub-models, sent from scoring engine 110 (step 312). Results combiner 112 generates overall predictions based on combining the results received from scoring engine 110 (step 314). For a given predictive model, results combiner 112 can combine the results based on combination methods associated with, e.g., defined in, the given predictive model or other default PMML combination methods. For example, if two or more prediction results meet a tie-condition wherein the prediction results conflict, results combiner 112 can use combination methods defined in the given predictive model to determine an overall prediction. After combining the results for making overall predictions, results combiner 112 can send the overall predictions to analytic applications 105 for further processing.

Figure 4A:
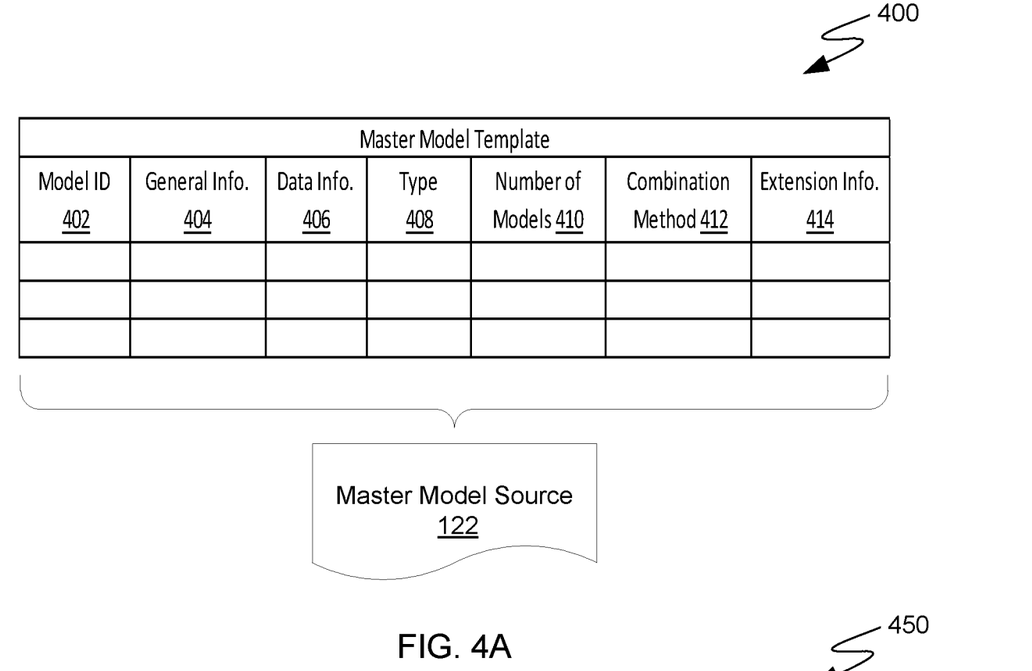
FIGS. 4A-B are an illustration of a master model template and associated models template, respectively, in accordance with an embodiment of the present invention.

FIG. 4A is a depiction of a master model template 400 comprising master model source 122, in accordance with an embodiment of the present invention. Master model template 400 is a table of model information associated with one or more predictive models. Master model template 400 comprises the following categories of model information, arranged by column: model ID 402, general information 404, data information 406, type 408, number of models 410, combination method 412 and extension information 414.

Model ID 402 comprises identifying information, e.g., a name and/or number, which distinguishes each of the one or more predictive models. General information 404 comprises information such as, but not limited to, version information (e.g., PMML version), copyright information and configuration information. Data information 406 comprises information such as, but not limited to, data fields (used by the predictive model listed in the corresponding row) and mapping information between user data and the data fields.

Type 408 comprises the type of the predictive model listed in the corresponding row and number of models 410 comprises the number of sub-models corresponding to the predictive model. Combination method 312 comprises combination methods corresponding to the predictive model, wherein the combination methods define how the prediction results of sub-models derived from a given predictive model should be combined. Extension information 314 comprises information for extending the content of a predictive model.

Figure 4B:
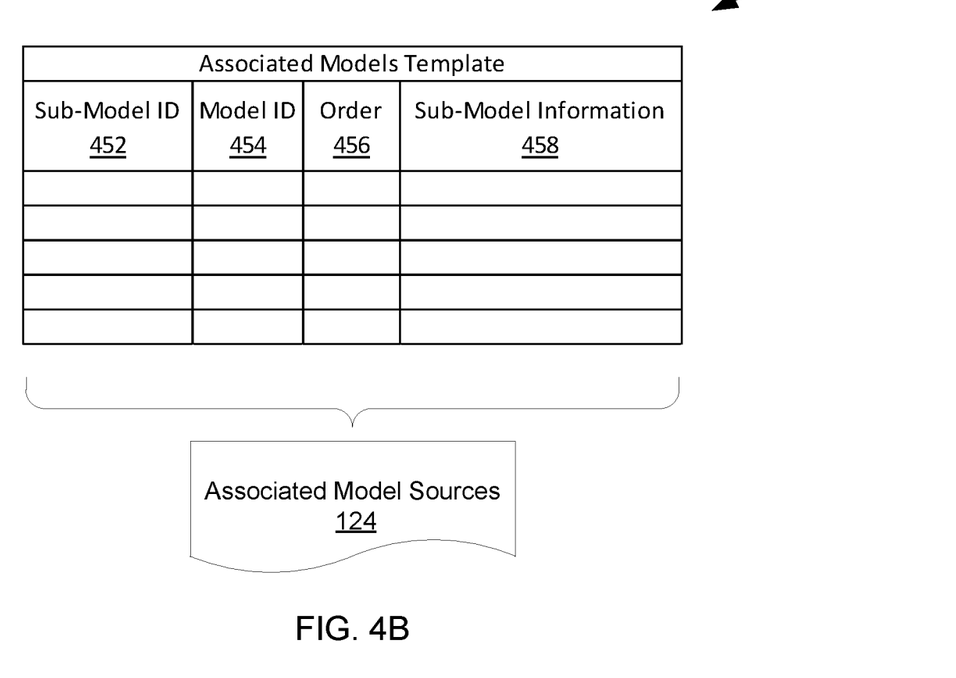

FIG. 4B is a depiction of an associated models template 450 comprising associated model sources 124, in accordance with an embodiment of the present invention. Associated models template 450 comprises sub-model ID 452, model ID 454, order 456 and sub-model information 458. Sub-model ID 452 comprises identifying information, e.g., a name and/or number, which distinguishes each sub-model. Model ID 454 comprises for identifying information for a predictive model associated with the sub-model listed in the same row. Order 456 comprises an order number corresponding to an order that the sub-model listed in the row occurs in the associated predictive model. Sub-model information 458 comprises a segment of the predictive model associated with the sub-model listed in the corresponding row. For example, sub-model information 458 comprises segments of predictive models, e.g., associated with composition relationships.

Model generator 108 can use master model template 400 and associated models template 450 to create a set of sub-models associated with a large predictive model. For example, model generator 108 can create a set of sub-models, associated with a large predictive model, in PMML using information from master model template 400 and associated models template 450. Each created sub-model in the set can comprise information from master model template 400, such as, but not limited to, information comprising general information 404 and data information 406, associated with the large predictive model. Each sub-model in the set can further comprise specific information from associated models template 450 associated with different segments of the large predictive model, wherein sub-models in the set can comprise different segments or combinations of segments. It should be further noted that results combiner 112 can access master model template 400 for determining the combination method associated with a predictive model for combining received prediction results associated with a set of sub-models.

Figure 5:
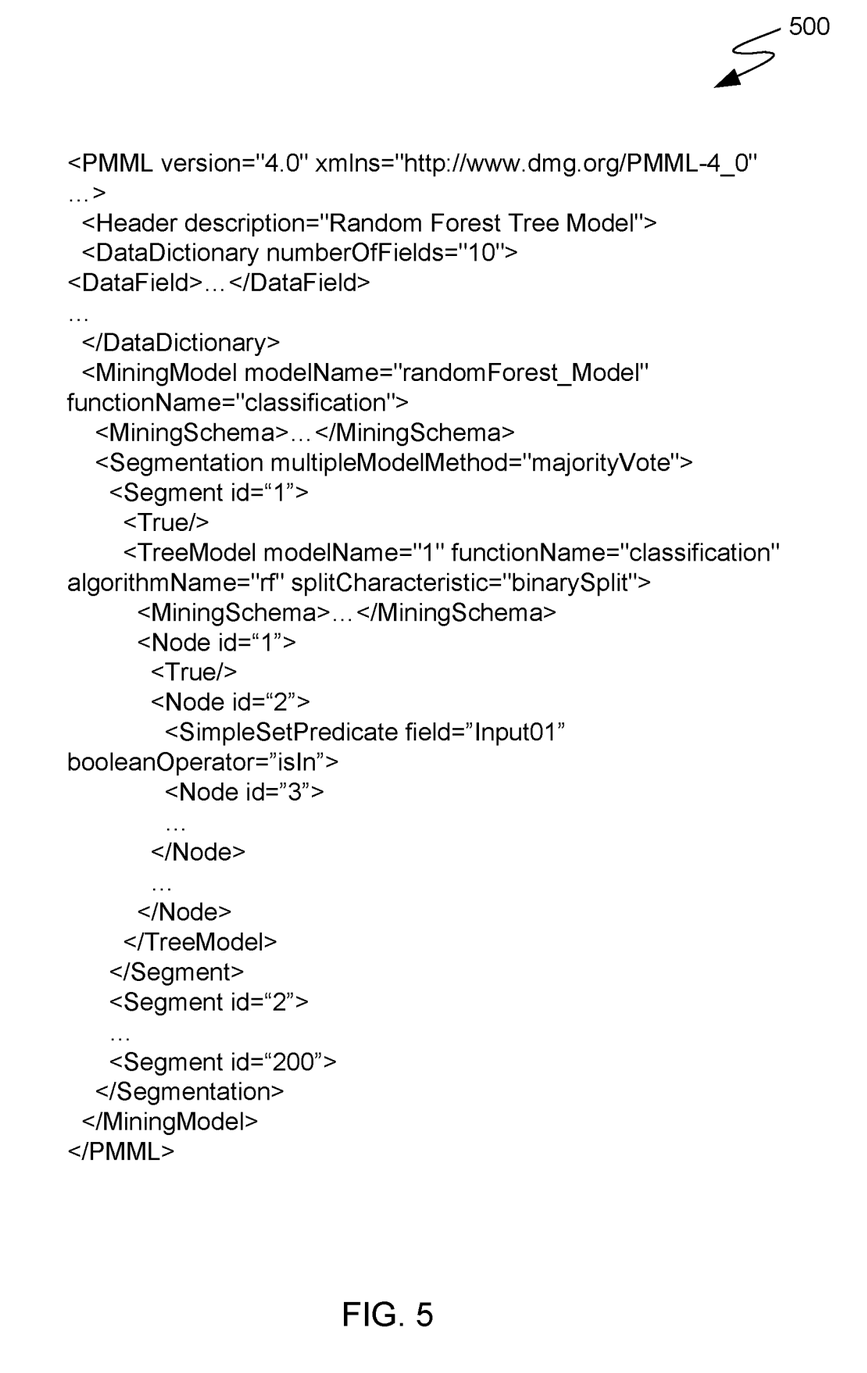
FIG. 5 is an example of a large predictive model, in accordance with an embodiment of the present invention.

FIG. 5 depicts an example large predictive model 500 represented in PMML, in accordance with an embodiment of the present invention. It should be noted that large predictive model 500 is only intended to be an illustrative example and as presented, depicts an incomplete predictive model, abbreviated for convenience. Model adapter 106 can extract information from large predictive model 500 and store the extracted information in master model source 122 and associated model sources 124, as will be described and depicted with regard to FIGS. 6A and 6B.

Figure 6A:
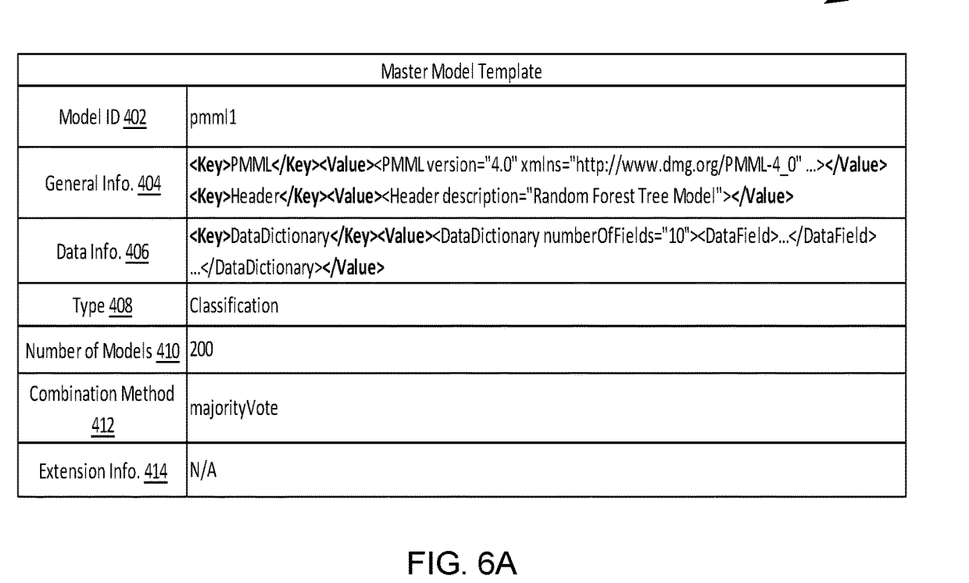
FIGS. 6A-B are an example master model template and an example associated models template, respectively, populated with information associated with the large predictive model of FIG. 5, in accordance with an embodiment of the present invention.

FIG. 6A depicts an example master model template 600 with information associated with a predictive model, in accordance with an embodiment of the present invention. It should be noted that although the categories are listed by row in master model template 600 for reading convenience, the information comprising each category can be arranged by column as depicted in master model template 400 (FIG. 4A). Information comprising master model template 600 has been extracted by model adapter 106 from the "pmml 1" model, associated with example large predictive model 500, and stored in master model template 600.

Figure 6B:
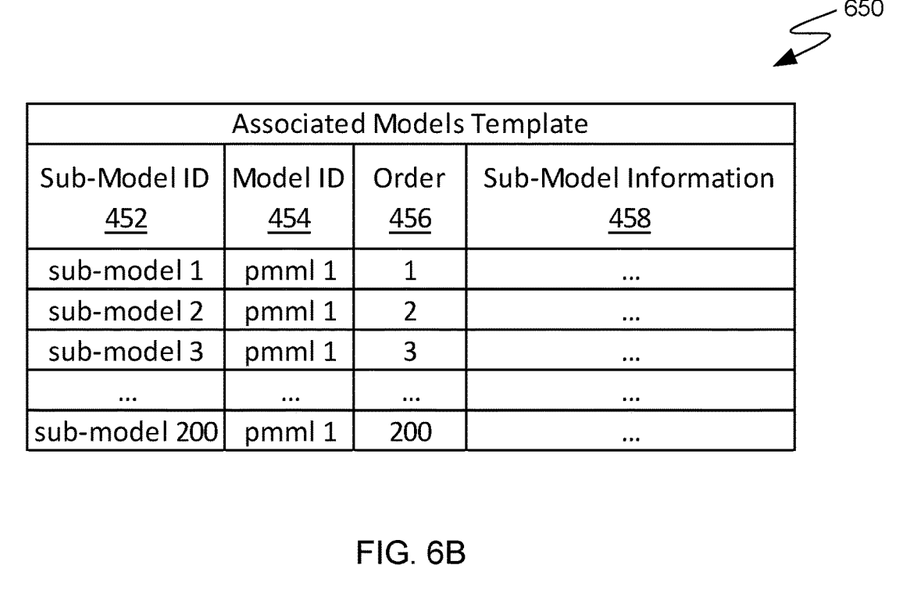

FIG. 6B depicts an example associated models template 650, in accordance with an embodiment of the present invention. Sub-models 1-200, listed under sub-model ID 452, are associated with different segments corresponding to predictive model "pmml 1" (associated with example large predictive model 500), listed under model ID 454. Model generator 108 can populate sub-models created in PMML with information comprising master model template 600. For example, model generator 108 can populate sub-models 1-200 with information comprising, but not limited to, general information and data information from master model template 600. Sub-model information 458 in associated models template 650 comprises different segments (not shown) of model "pmml 1", segments which can be based on composition relationships. Model generator 108 populates sub-models 1-200 with the corresponding information from sub-model information 458 to create unique, independent sub-models derived from "pmml 1".

Figure 7:
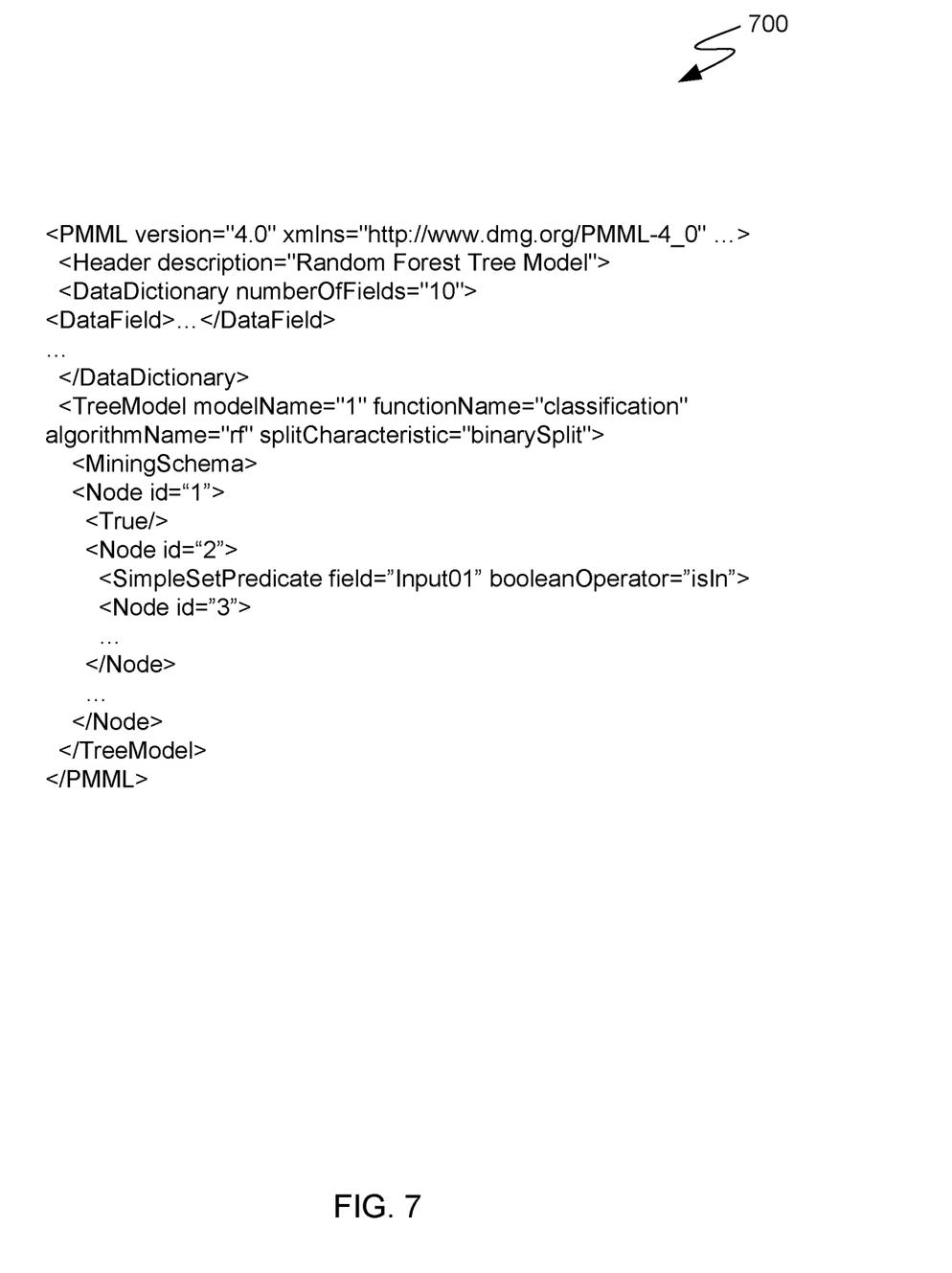
FIG. 7 is an example of a sub-model derived from the large predictive model of FIG. 5, in accordance with an embodiment of the present invention.

FIG. 7 depicts an example sub-model 700, in accordance with an embodiment of the present invention. Sub-model 700, associated with large predictive model 500, is created by model generator 108 in PMML using information from master model template 600 and associated models template 650. It should be noted that sub-model 700 is only intended to be an illustrative example and as presented, depicts an incomplete predictive model, abbreviated for convenience. Sub-model 700 corresponds to "sub-model 1" in associated models template 650 and comprises information associated with "<segment id="1">" from large predictive model 500. Other sub-models can have information associated with one or more other segments of large predictive model 500, e.g., <segment id="2">, etc.

Figure 8:
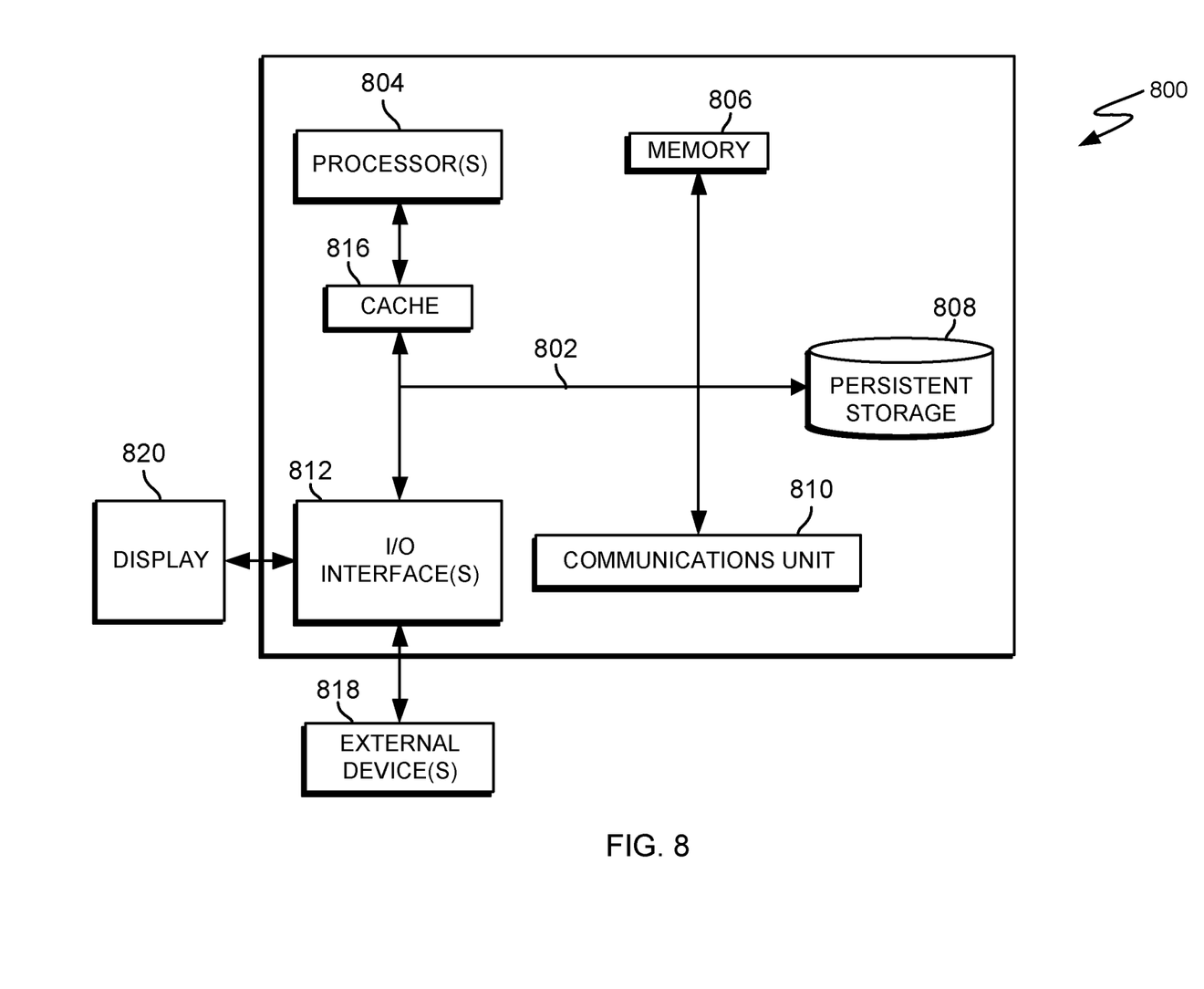
FIG. 8 is a block diagram of components of a server computer executing the model decomposer, in accordance with an embodiment of the present invention.

FIG. 8 depicts a block diagram 800 of components of server computer 102 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Server computer 102 includes communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Model decomposer 104 can be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 can provide communications through the use of either or both physical and wireless communications links. Model decomposer 104 can be downloaded to persistent storage 808 through communications unit 810.

I/O interface(s) 812 allows for input and output of data with other devices that can be connected to server computer 102. For example, I/O interface 812 can provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., model decomposer 104, can be stored on such portable computer readable storage media and can be loaded onto persistent storage 808 via I/O interface(s) 812. I/O interface(s) 812 also connect to a display 820. Display 820 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A non-transitory computer program product for optimizing predictive model analysis, the computer program product comprising:
   one or more computer readable hardware storage devices and program instructions stored on the one or more computer readable hardware storage devices, the program instructions comprising:
   program instructions to create, by a model decomposer, one or more model templates;
   program instructions to decompose, by the model decomposer, a predictive model, wherein decomposing the predictive model includes extracting model information from the predictive model, detecting schema elements of a detected model type, following the one or more composition relationships to find occurrences of one or more sub-elements associated with the schema elements, and decomposing the model information into segments based on one or more composition relationships associated with the detected model type;
   program instructions to store, by the model decomposer, the decomposed model information in the one or more model templates;
   program instructions to create, by the model decomposer, a plurality of sub-models, associated with the predictive model, based, at least in part, on the stored decomposed model information, wherein the stored decomposed model information includes the one or more sub-elements associated with the schema elements;
   program instructions to send, by the model decomposer, the plurality of sub-models to a scoring engine;
   program instructions to receive, by the model decomposer, results based on the plurality of sub-models from the scoring engine; and
   program instructions to generate, by the model decomposer, predictions based on combining the results received from the scoring engine.

2. The non-transitory computer program product of claim 1, wherein the one or more model templates are database tables stored in a model repository and comprise a master model template and an associated models template.

3. The non-transitory computer program product of claim 2, wherein the master model template comprises information which is common to the plurality of sub-models.

4. The non-transitory computer program product of claim 2, wherein the associated models template comprises a plurality of segments associated with the predictive model and different sub-models of the plurality of sub-models comprise different segments of the plurality of segments.

5. The non-transitory computer program product of claim 1, wherein the results are combined based on at least one of a combination method associated with the predictive model and a default combination method.

6. The non-transitory computer program product of claim 1, wherein the scoring engine comprises one or more computing facilities and a subset of the plurality of sub-models is sent to a portion of the computing facilities based on a type of data the portion of the computing facilities are processing.

7. The non-transitory computer program product of claim 1, further comprising:
program instructions to send, by the model decomposer, the generated predictions to one or more analytic applications for further processing.

8. A computer system for optimizing predictive model analysis, the computer system comprising:
one or more computer processors;
one or more computer readable storage media;
program instructions stored on the one or more computer readable storage media for execution by at least one of the one or more processors, the program instructions comprising:
program instructions to create, by a model decomposer, one or more model templates;
program instructions to decompose, by the model decomposer, a predictive model, wherein decomposing the predictive model includes extracting model information from the predictive model, detecting schema elements of a detected model type, following the one or more composition relationships to find occurrences of one or more sub-elements associated with the schema elements, and decomposing the model information into segments based on one or more composition relationships associated with the detected model type;
program instructions to store, by the model decomposer, the decomposed model information in the one or more model templates;
program instructions to create, by the model decomposer, a plurality of sub-models, associated with the predictive model, based, at least in part, on the stored decomposed model information, wherein the stored decomposed model information includes the one or more sub-elements associated with the schema elements;
program instructions to send, by the model decomposer, the plurality of sub-models to a scoring engine;
program instructions to receive, by the model decomposer, results based on the plurality of sub-models from the scoring engine; and
program instructions to generate, by the model decomposer, predictions based on combining the results received from the scoring engine.

9. The computer system of claim 8, wherein the one or more model templates are database tables stored in a model repository and comprise a master model template and an associated models template.

10. The computer system of claim 9, wherein the master model template comprises information which is common to the plurality of sub-models.

11. The computer system of claim 9, wherein the associated models template comprises a plurality of segments associated with the predictive model and different sub-models of the plurality of sub-models comprise different segments of the plurality of segments.

12. The computer system of claim 8, wherein the results are combined based on at least one of a combination method associated with the predictive model and a default combination method.

13. The computer system of claim 8, further comprising:
program instructions to send, by the model decomposer, the generated predictions to one or more analytic applications for further processing.

* * * * *